United States Patent
Ismert

[19]

[11] Patent Number: 6,126,122
[45] Date of Patent: Oct. 3, 2000

[54] DOUBLE RATCHET ARM PIPE CLAMP

[75] Inventor: Joseph P. Ismert, Kansas City, Mo.

[73] Assignee: Sioux Chief Manufacturing Co., Inc., Peculiar, Mo.

[21] Appl. No.: 08/965,302

[22] Filed: Nov. 6, 1997

[51] Int. Cl.[7] .................................................. F16L 3/08
[52] U.S. Cl. ...................... 248/74.1; 248/68.1; 248/74.4; 24/271
[58] Field of Search ............................. 248/68.1, 74.1, 248/74.4, 292.12, 74.2, 230.5, 231.61, 316.6, 74.3; 24/271, 525, 129 A, 135 R

[56] References Cited

U.S. PATENT DOCUMENTS

| | | | |
|---|---|---|---|
| 2,890,848 | 6/1959 | Johnson, Jr. | 248/74 |
| 2,904,294 | 9/1959 | Marygold | 248/74 |
| 2,931,607 | 4/1960 | McFarland | 248/68 |
| 3,128,073 | 4/1964 | Berlyn | 248/55 |
| 3,188,030 | 6/1965 | Fischer | 248/68 |
| 3,802,655 | 4/1974 | Schuplin | 248/74 R |
| 3,848,840 | 11/1974 | Umerzu | 248/73 |
| 4,076,199 | 2/1978 | Paulsen | 248/68 R |
| 4,244,083 | 1/1981 | Aremka | 24/263 |
| 4,768,741 | 9/1988 | Logsdon | 248/62 |
| 5,131,613 | 7/1992 | Kamiya et al. | 248/74.3 |
| 5,149,026 | 9/1992 | Allen | 248/68.1 |
| 5,150,865 | 9/1992 | Miller | 248/71 |
| 5,638,706 | 6/1997 | Stevens | 70/19 |

*Primary Examiner*—Derek J. Berger
*Assistant Examiner*—Kimberly Wood
*Attorney, Agent, or Firm*—Litman, Kraai & Brown L.L.C.

[57] ABSTRACT

A double ratchet arm pipe clamp includes a pair of elongated ratchet arms extending outward from a base member with each ratchet arm including a plurality of ratchet teeth. A keeper block is adapted to receive the ratchet arms through a pair of apertures and a respective pawl member is positioned within each aperture to releasably engage the ratchet arm. Both the base member and the keeper block have respective V shaped notches which are positioned in opposition to cradle a clamped pipe or cable and a pair of slits are formed in the keeper block to give added clamping action. An alternative embodiment of double ratchet arm pipe clamp is clamping a pipe to a universal slider bracket.

10 Claims, 3 Drawing Sheets

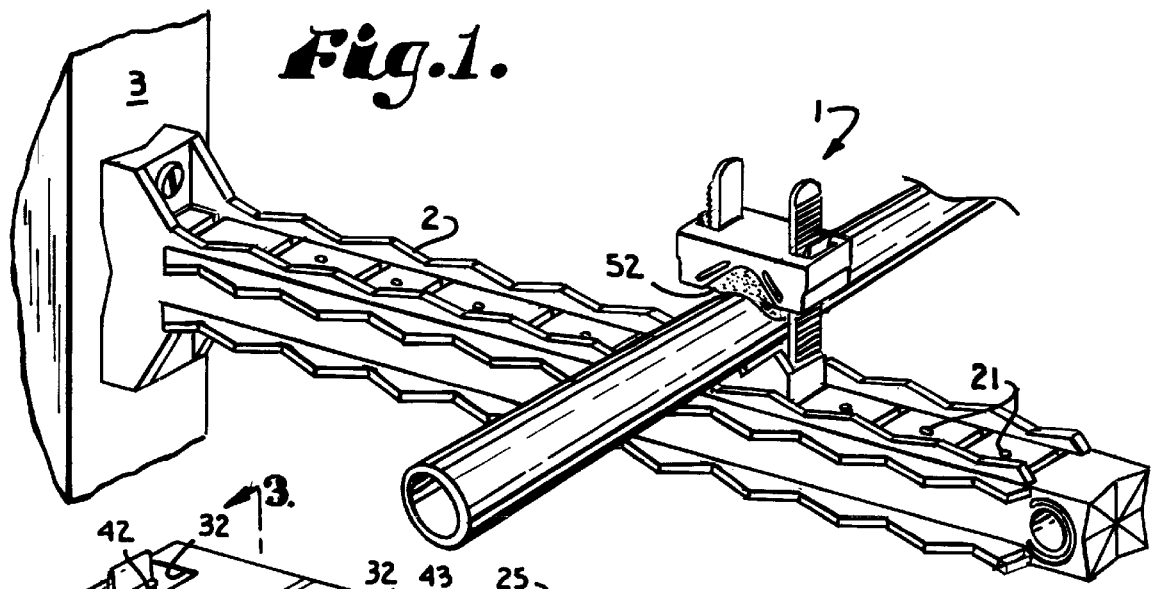
Fig.1.
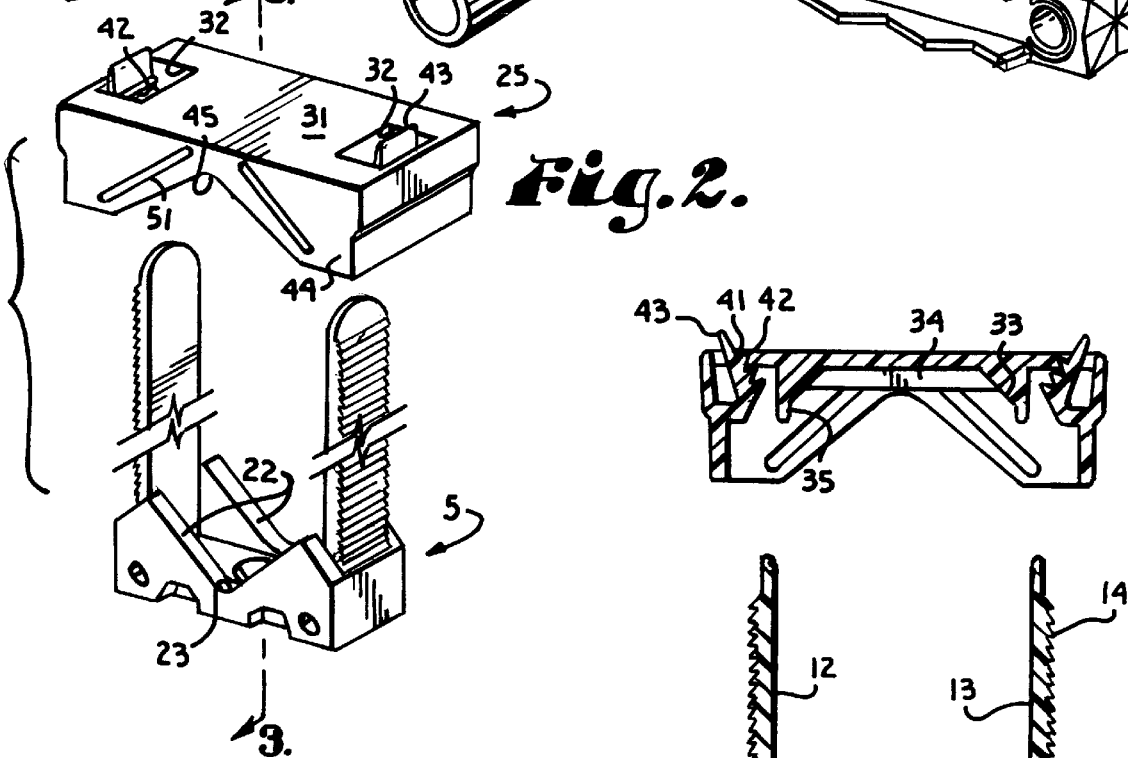
Fig.2.
Fig.3.

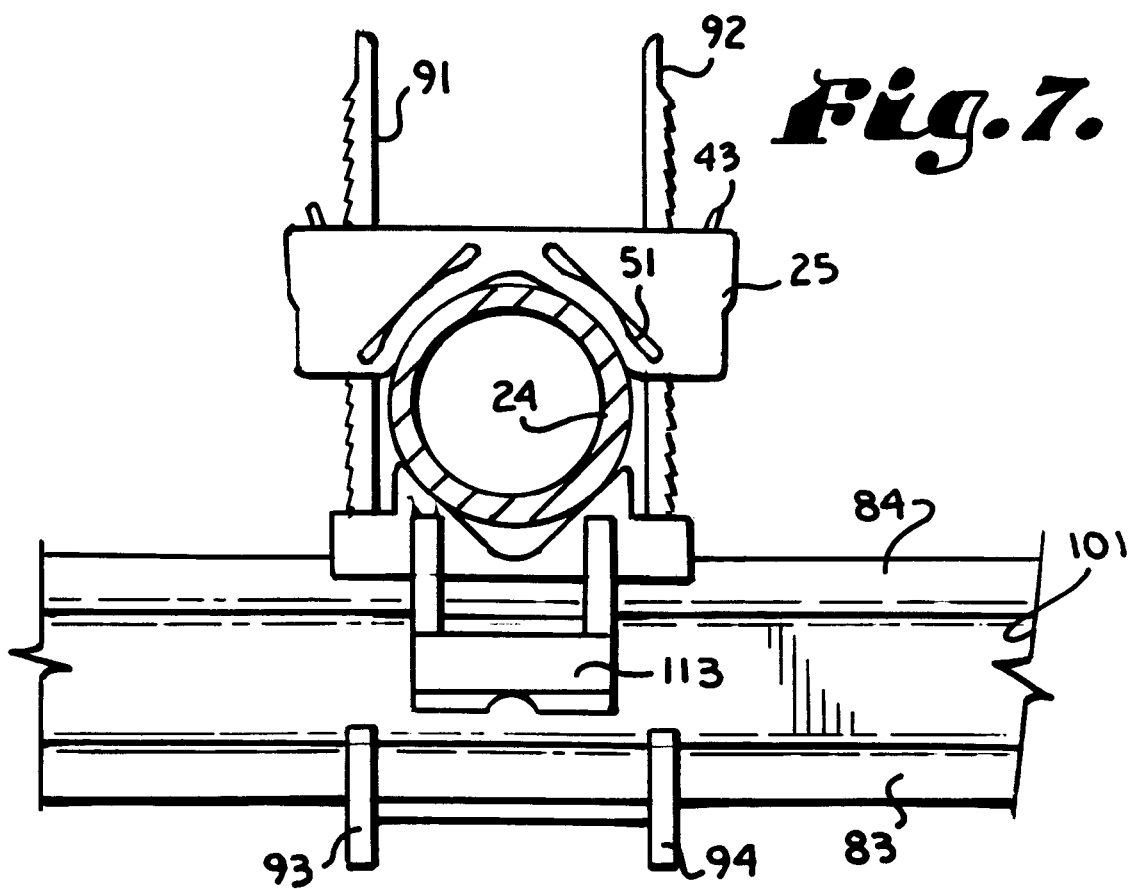

DOUBLE RATCHET ARM PIPE CLAMP

FIELD OF THE INVENTION

The present invention relates to an improved pipe clamp, and, more particularly, to such an improved pipe clamp which includes a pair of ratchet arms extending upward from a clamp base. A mating keeper block has a pair of apertures positioned and configured to receive respective ones of the ratchet arms such that the keeper block is movable toward the base along the ratchet arms to secure a pipe or cable there between. The ratchet arms maintain the keeper block and a secured pipe of cable in position.

BACKGROUND OF THE INVENTION

A wide variety of clamps have been devised for holding pipes, cables, wires, etc. in position. Many of these clamps rely on some type of ratcheting action to maintain the clamp tightly against the pipe, cable, etc. A common example is an ordinary nylon loop which includes a double ended flexible strap. Serrated teeth extend along a bottom side of the strap from a free terminal end thereof. The end of the strap opposite the free terminal end includes a molded receiver with an internal tooth or teeth which engage the teeth on the strap as it is doubled back on itself around a wire bundle, pipe, cable, etc. The mutually engaging teeth on the strap and the receiver provide a ratcheting action which snugly secures the strap around the wire bundle.

Other examples of ratcheting pipe or cable clamps include that taught in U.S. Pat. No. 2,931,607 (the "'607 patent") to McFarland entitled Quick Release Cable Support System. The clamp in the '607 patent includes a staple with a plurality of V shaped notches along one or both legs of the staple. The V shaped notches perform a ratcheting action with one or more spring receivers and include a notch for receiving a quick release rod which can be manipulated to release the springs and allow the staple to be disengaged with the spring(s). The clamp in the '607 patent is designed to extend through a support such as a special bracket, and is not otherwise easily securable to an existing surface. The spring retainers are separate pieces and are separate from one or more securing members which also fit over the staple legs. Finally, release of the '607 patent clamp requires a separate special release tool which is inserted to disengage the spring(s).

Another example of a ratcheting clamp is found in U.S. Pat. No. 4,244,083 to Aremka et al (the "'083 patent"). The clamp in the '083 patent is of a somewhat similar construction to that in the '607 patent except that a U shaped staple has legs which each have notches along the exterior thereof. The staple legs extend through rectangular openings in a mating plate and the plate has a pair of upstanding wedge shaped walls which engage a pipe or cable and wedge it toward one side of the clamp. Release of the clamp is accomplished by forcing the legs together to disengage the notches from the outside edges of the openings and pulling the plate off of the legs. The clamp in the '083 patent does have a through bore in the base of the staple for receiving a screw or bolt to attach it to an existing surface. However, engagement of the staple legs with the plate is accomplished only by the notches engaging the edge of the plate openings. This is not a very positive engagement. Furthermore, the wedge shaped walls on the plate force a clamped pipe or cable to one side or the other of the clamp, which may not be desirable. Finally, the plate appears to be rigid, thus providing no clamping action of its own separate from the ratcheting action of the teeth engaging the plate openings.

It is clear, then, that a need still exists for a convenient, effective, economical pipe or cable clamp. Such a clamp should preferably include an easily releasable ratcheting action, should positively grip an engaged pipe or clamp, and should be usable with a specialized bracket or as a stand alone clamp attached to a wall or ceiling surface.

SUMMARY OF THE INVENTION

The present invention is directed to a double ratchet arm pipe clamp including a clamp base member formed by a base plate with a pair of elongated ratchet arms extending outward from the base plate. Each ratchet arm has a plurality of ratchet teeth formed along an outside surface. A keeper block has a pair of arm receiving apertures formed therethrough near respective opposite ends thereof, with each arm receiving aperture having an anvil surface. A respective pawl member is positioned within each aperture with each pawl member being resiliently urged toward the anvil surface of the respective aperture. The keeper block is received on the clamp base member with each ratchet arm extending through a respective arm receiving aperture. The ratchet teeth on each ratchet arm engage the respective pawl member in the aperture through which the arm extends. Each pawl member includes an extension which protrudes outward from the keeper block which, if pushed outward, disengages the pawl member from the ratchet teeth to thereby release the ratchet arm. The clamp base member includes a central aperture which is countersunk to receive a screw to attach it to an existing surface. The clamp base member includes a pair of upstanding walls positioned on respective sides of the central aperture which walls include a V shaped notch. The keeper block also includes a pair of walls positioned along respective sides with each keeper block wall also including a V shaped notch. Each keeper block wall also includes a pair of slits extending through the wall just outside respective sides of the V shaped notch. The slits allow the V shaped notches in the walls of the keeper block to be compressed to better grip a pipe or cable clamped between the keeper block and the clamp base member. An adapter block is provided to adapt the double ratchet arm pipe clamp for attachment to a conventional strut channel.

In an alternative embodiment of double ratchet arm pipe clamp, a pair of ratchet arms extend upward from respective ones of a pair of walls connected together by a base member. The base member is sized and shaped to fit within a recess in a universal slider bracket with each wall incorporating an angled slot which engages a bottom leg of the slider bracket. The clamp is formed by a bottom keeper block with a pair of apertures which receive the ratchet arms and a top keeper block which also includes a pair of apertures which engage the ratchet arms. The bottom and top keeper blocks each include a pair of upstanding walls which include V shaped notches which oppose each other to cradle and secure a clamped pipe or cable. The bottom keeper block includes an extension which engages a top leg of the universal slider bracket to securely hold the clamp in place on the slider bracket.

OBJECTS AND ADVANTAGES OF THE INVENTION

The principal objects of the present invention include: providing an improved double ratchet arm pipe clamp; providing such a pipe clamp which includes a pair of ratchet arms extending outward from a clamp base member; providing such a pipe clamp in which the base member includes a pair of upstanding walls positioned on respective sides of a central aperture which walls each include a V shaped notch to cradle a clamped pipe or cable; providing such a pipe clamp with a keeper block which has a pair of arm receiving apertures formed therethrough for receiving the ratchet arms with a respective releasable pawl member positioned within each aperture to engage the ratchet arm; providing such a clamp in which the keeper block also includes a pair of upstanding walls, each of which also includes a V shaped notch arranged to oppose the V shaped notches in the clamp base; providing such a pipe clamp in which each keeper block wall also includes a pair of slits extending through the wall just outside respective sides of the V shaped notch to allow the V shaped notches to be compressed to better grip a pipe or cable clamped between the keeper block and the clamp base member; providing an alternative embodiment of double ratchet arm pipe clamp which is adapted for use with a universal slider bracket; and providing such a pipe clamp which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a double ratchet arm pipe clamp in accordance with the present invention being used with a universal pipe bracket.

FIG. 2 is an enlarged perspective view of the double ratchet arm pipe clamp of FIG. 1, with the keeper block removed from the ratchet arms.

FIG. 3 is an enlarged, cross sectional view of the double ratchet arm pipe clamp, taken along line 3—3 of FIG. 2, again with the keeper block removed from the ratchet arms.

FIG. 7 is an enlarged front elevational view of the double ratchet arm pipe clamp of FIG. 6, with both the bottom and top keeper blocks engaging the ratchet arms and with a pipe clamped between the bottom and top keeper blocks to such an extent that slits in the walls of the keeper block are compressed.

DETAILED DESCRIPTION OF THE INVENTION

Figure 4:
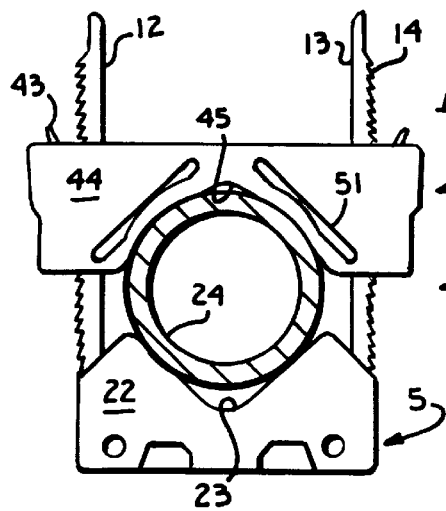
FIG. 4 is an enlarged front elevational view of the double ratchet arm pipe clamp of FIG. 1, with the keeper block engaging the ratchet arms and with a pipe clamped between the keeper block and the clamp base member to such an extent that slits in the walls of the keeper block are compressed.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1–4, a first embodiment of double ratchet arm pipe clamp is illustrated and generally indicated at 1. The pipe clamp 1 in FIG. 1 is shown, by way of example, as being attached to a universal pipe bracket 2 which bracket 2 is, in turn, attached to an upstanding wall support 3. The pipe clamp 1 is preferably made of molded plastic and includes a clamp base member 5 formed by a base plate 11 with a pair of elongated ratchet arms 12 and 13 extending outward from the base plate 11. Each ratchet arm 12 and 13 has a plurality of ratchet teeth 14 formed along an outside surface thereof. The clamp base member 5 includes a central aperture 15 extending through the base plate 11 which aperture 15 is countersunk to receive a screw (not shown) to attach it to an existing surface, such as to one of a plurality of pre-bored holes 21 in the universal pipe bracket 2, for example. The clamp base member 5 also includes a pair of upstanding walls 22 positioned on respective sides of the central aperture 15 which walls 22 each include a V shaped notch 23 for cradling a pipe, such as pipe 24 shown in FIG. 4.

A clamping keeper block 25 includes a keeper block plate 31 with a pair of arm receiving apertures 32 formed therethrough near respective opposite ends thereof and sized to receive respective ones of the ratchet arms 12 and 13, as shown in FIGS. 1 and 4. Each of the arm receiving apertures 32 has an inner anvil surface 33 formed by an angled extension of the keeper block plate 31. A pair of stiffening ribs 34 extend between the anvil surfaces 33 to give the keeper block added rigidity. A pair of guides 35 extend outward from the keeper block plate 31 with each pair of guides being positioned on respective opposing sides of one of the apertures 32 to provide an extended channel for one of the ratchet arms 12 or 13. A respective pawl member 41 is positioned within and hingedly attached to an outside wall of each aperture 32 with each pawl member 41 including a series of teeth 42 spaced to engage corresponding ratchet teeth 14 on the ratchet arm 12 or 13 extending through the aperture 32. Each pawl member 41 is molded in a manner such that is resiliently urged toward the anvil surface 33 of the respective aperture 32 so that the ratchet arm teeth 14 are captured by the teeth 42 on the pawl member 41. Each pawl member 41 includes an extension 43 which protrudes outward from the keeper block plate 31. The extensions 43, when pushed outward, disengage the pawl member teeth 42 from the ratchet teeth 14 to thereby release the ratchet arms 12 and 13.

The keeper block 25 also includes a pair of keeper block walls 44 positioned along respective sides of the keeper block plate 31 with each keeper block wall 44 also including a V shaped notch 45. When the keeper block 25 is ratcheted downward along the ratchet arms 12 and 13, the V shaped notches 45 on the keeper block 25 are positioned in opposition to the V shaped notches 23 on the base member 5 to cradle the pipe 24 therebetween. Each keeper block wall 44 also includes a pair of slits 51 extending through the wall 44 just outside respective sides of the V shaped notch 45. As the keeper block 25 is ratcheted downward against the clamped pipe 24, the slits 51 compress, as shown in FIG. 4, thus placing additional clamping pressure on the clamped pipe 24. An optional resilient pad 52, as shown in FIG. 1, can be used for cushioning the pipe 24, if desired, particularly where the pipe 24 is plastic. An additional pad (not shown) can be placed on the clamp base member 5 to cushion the bottom side of the pipe 24.

Figure 5:
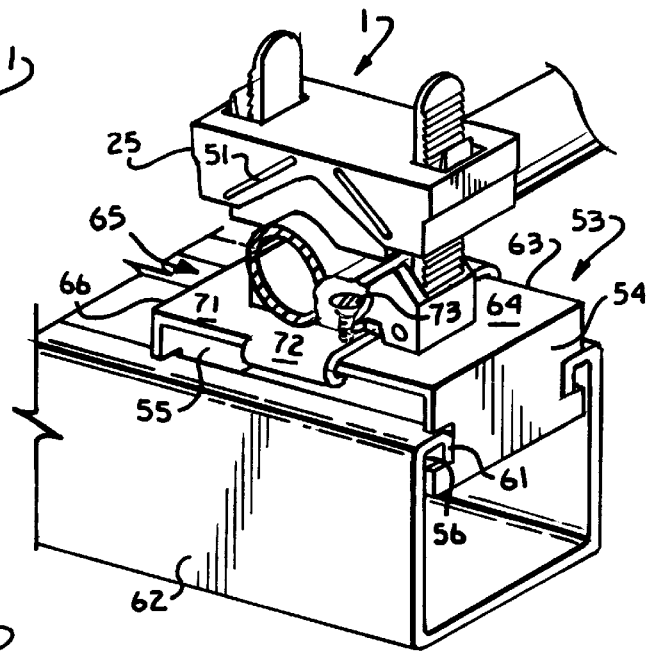
FIG. 5 is an enlarged perspective view of the double ratchet arm pipe clamp of FIG. 1 attached to an adaptor which adaptor is, in turn, connected to a length of strut channel.

An adaptor 53 is shown in FIG. 5 mounting the double ratchet arm pipe clamp 1. The adaptor 53 includes a pair of end plates 54 and 55, each of which includes a respective pair of recesses 56, each of which is sized and positioned to accommodate one inward extending leg 61 of a length of strut channel 62. The adaptor 53, which can be made of sheet metal, for example, is of a two part construction with a first L shaped section 63 including the first end plate 54 and a first perpendicular plate 64. A second L shaped section 65 includes the second end plate 55 and a second perpendicular plate 71. The second perpendicular plate 71 includes a pair of opposing extensions which are formed as rolled over lips 72 which lips 72 form a channel for receiving the first perpendicular plate 64. The first section 63 thus telescopes in and out of the channel formed by the lips 72 of the second section 65. A threaded bore 73, shown in dotted lines, receives a screw 74 extending through the countersunk aperture 15 in the clamp 1 to mount the clamp 1 to the adaptor 53. The screw 74 also serves as a set screw to keep the first and second sections 63 and 65 of the adaptor 53 from moving relative to each other.

Figure 6:
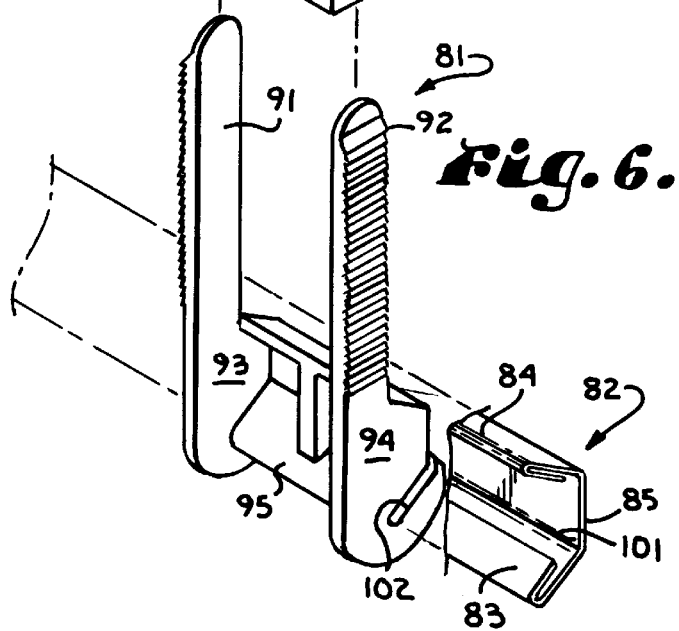
FIG. 6 is an enlarged perspective view of an alternative embodiment of double ratchet arm pipe clamp attached to a universal slider bracket and with a bottom keeper block removed from the ratchet arms.

FIGS. 6 and 7 illustrate an alternative embodiment of double ratchet arm pipe clamp, generally indicated at 81. The clamp 81 is designed for attachment to a universal slider bracket 82, which has a pair of angled legs 83 and 84 interconnected by a web 85. The clamp 81 includes a pair of ratchet arms 91 and 92 extending upward from respective ones of a pair of walls 93 and 94. The walls 93 and 94 are attached to respective opposite ends of a base member 95. The base member 95 is sized and shaped to fit within a recess 101 formed between the two angled legs 83 and 84 of the universal slider bracket 82. Each of the walls 93 and 94 includes an angled slot 102 which slots 102 engage the bottom leg 83 of the slider bracket 82. The clamp 81 also includes a bottom keeper block 103 with a pair of apertures 104 which receive respective ones of the ratchet arms 91 and 92, but the apertures 104, as illustrated, do not incorporate any teeth to provide a ratcheting action with the arms 91 and 92. Alternatively, the apertures 104 can incorporate ratcheting pawl members 41 similar to those shown in the top keeper block 25 of FIGS. 1–4, if desired. A top keeper block 25 (FIG. 7) is also provided, which top keeper block 25 is identical to the keeper block 25 shown in FIGS. 1–4, with components numbered the same. The bottom keeper block 103 also includes a pair of upstanding walls 111 which include V shaped notches 112 which oppose the V shaped notches 45 in the top keeper block 25 to cradle the clamped pipe 24, as shown in FIG. 7. The bottom keeper block 103 includes an extension 113 which engages the outside of the top leg 84 of the universal slider bracket 82 to securely hold the clamp 81 in place on the slider bracket 82.

While the pipe clamps 1 and 81 have been described and illustrated as including ratchet teeth 14 on both ratchet arms 12, 13 or 91, 92, it is possible to use ratchet teeth 14 on only one of the arms. The placement of the ratchet teeth on the outside surfaces of the arms is exemplary only, and placement on the inside surfaces, with the pawls 41 hinged to the inside walls of the apertures 32, could be effective as well. The placement of the slits 51 in the keeper block 25 is also by way of example only, and other positions within the walls, or more or fewer slits could be used as well. The term "pipe" in the title is not intended to be limiting in that the inventive clamp can be used with cables, conduit, wire, wire bundles, or any other elongate structure to be clamped in place. It is thus to be understood that while certain forms of the present invention have been illustrated and described herein, it is not to be limited to the specific forms or arrangement of parts described and shown.

I claim:

1. A clamp assembly for releasably securing a single elongate member to a support structure and comprising:
   a) a clamp base member including:
      i) a base plate;
      ii) a pair of ratchet arms extending outward in substantially parallel relation from said base plate, each said ratchet arm having a plurality of ratchet teeth formed along at least one surface thereof; and
      iii) a pair of upstanding base walls extending outward from said base plate in the same direction as said ratchet arms, each of the walls in said pair including a respective V shaped notch; and
   b) a keeper block including a keeper block plate with a pair of ratchet arm receiving apertures formed therethrough, said arm receiving apertures being positioned and spaced such that each ratchet arm of said pair extends through a respective one of said arm receiving apertures, said keeper block also including a respective anvil surface and a hinged pawl member positioned proximate each arm receiving aperture on opposing sides thereof, each said pawl member being resiliently urged toward its opposing anvil surface so as to provide a ratchet action on the ratchet teeth along a respective one of said ratchet arms extending between the pawl member and the anvil surface as it extends through the arm receiving aperture, said keeper block further comprising a pair of upstanding keeper walls extending outward from said keeper plate, each of the keeper walls in said pair including a respective V shaped notch, the V shaped notches on said keeper block being positioned in opposition to the V shaped notches on said base when said ratchet arms extend through said arm receiving apertures so as to form a variable opening for receiving the single elongate member such that the single elongate member is adjustably clamped between said clamp base member and said keeper block.

2. A clamp assembly as in claim 1, and further comprising a mounting aperture extending through said base plate.

3. A clamp assembly as in claim 1, each of said pawl members in said keeper block comprising a plurality of pawl ratchet teeth sized and positioned to engage the ratchet teeth along the respective one of said ratchet arms extending between that pawl member and the opposing anvil surface as it extends through the arm receiving aperture.

4. A clamp assembly as in claim 3, each of said pawl members further comprising a pawl extension which protrudes outward past the keeper block plate, said pawl extensions, when urged away from the opposing anvil surface, acting to disengage the pawl member ratchet teeth from the ratchet teeth along the respective one of said ratchet arms extending between that pawl member and the opposing anvil surface as it extends through the arm receiving aperture.

5. A clamp assembly as in claim 1, said base member further comprising two pairs of slits with a respective one of said pair of slits extending each of said keeper walls, said slits in each pair being positioned along respective sides of the V shaped notch in that keeper wall.

6. A clamp assembly as in claim 1, and further comprising:

(a) a resilient pad positioned on said keeper block to cushion said elongate member when it is secured in said clamp assembly.

7. A clamp assembly for releasably secures a single elongate member to a support structure and comprising:
   a) a clamp base member including;
      i) a base plate;
      ii) a pair of ratchet arms extending outward in substantially parallel relation from said base plate, each said ratchet arm having a plurality of ratchet teeth formed along at least one surface thereof; and
      iii) a pair of upstanding base walls extending outward from said base plate in the same direction as said ratchet arms, each of the walls in said pair including a respective V shaped notch; and
   b) a keeper block including:
      i) a keeper block plate with a pair of ratchet arm receiving apertures formed therethrough, said arm receiving apertures being positioned and spaced such that each ratchet arm of said pair extends through a respective one of said arm receiving apertures;
      ii) a respective anvil surface and a hinged pawl member positioned proximate each arm receiving aperture on opposing sides thereof, each said pawl member being resiliently urged toward its opposing anvil surface so as to provide a ratchet action on the ratchet teeth along a respective one of said ratchet arms extending between the pawl member and the anvil surface as it extends through the arm receiving aperture, each of said pawl members comprising a plurality of pawl ratchet teeth sized and positioned to engage the ratchet teeth along the respective one of said ratchet arms extending between that pawl member and the opposing anvil surface as it extends through the arm receiving aperture; and
      iii) said keeper block further comprises a pair of upstanding keeper walls extending outward from said keeper plate, each of the keeper walls in said pair including a respective V shaped notch, the V shaped notches on said keener block being positioned in opposition to the V shared notches on said base when said ratchet arms extend through said arm receiving apertures so as to form a variable opening for receiving the single elongate member such that the single elongate member is adjustably clamped between said clams base member and said keeper block.

8. A clamp assembly as in claim 7, said base member further comprising a mounting aperture extending through said base plate.

9. A clamp assembly as in claim 8, each of said pawl members in said keeper block further comprising a pawl extension which protrudes outward past the keeper block plate, said pawl extensions, when urged away from the opposing anvil surface, acting to disengage the pawl member ratchet teeth from the ratchet teeth along the respective one of said ratchet arms extending between that pawl member and the opposing anvil surface as it extends through the arm receiving aperture.

10. A clamp assembly as in claim 7, said keeper member further comprising two pairs of slits with a respective one of said pair of slits extending each of said keeper walls, said slits in each pair being positioned along respective side of the V shaped notch in that keeper wall.

* * * * *